(12) United States Patent
Kothera et al.

(10) Patent No.: US 7,931,240 B2
(45) Date of Patent: Apr. 26, 2011

(54) CELLULAR SUPPORT STRUCTURES USED FOR CONTROLLED ACTUATION OF FLUID CONTACT SURFACES

(75) Inventors: Curt S. Kothera, Crofton, MD (US); Benjamin K. S. Woods, College Park, MD (US); Norman M. Wereley, Potomac, MD (US); Peter C. Chen, Clarksville, MD (US); Edward A. Bubert, College Park, MD (US)

(73) Assignees: Techno-Sciences, Inc., Calverton, MD (US); University of Maryland, Riverdale, MD (US)

( * ) Notice: Subject to any disclaimer, the term of this patent is extended or adjusted under 35 U.S.C. 154(b) by 703 days.

(21) Appl. No.: 11/707,052

(22) Filed: Feb. 16, 2007

(65) Prior Publication Data

US 2008/0035788 A1 Feb. 14, 2008

Related U.S. Application Data

(63) Continuation-in-part of application No. 11/502,360, filed on Aug. 11, 2006.

(51) Int. Cl.
B64C 3/54 (2006.01)
(52) U.S. Cl. .................. 244/218; 244/99.8; 244/99.2
(58) Field of Classification Search .................. 244/130, 244/218, 219, 45 R, 46, 35 R, 99.2, 99.3, 244/99.7, 99.8
See application file for complete search history.

(56) References Cited

U.S. PATENT DOCUMENTS

| | | | | |
|---|---|---|---|---|
| 1,653,903 A | * | 12/1927 | Hall | 244/218 |
| 1,815,814 A | * | 7/1931 | Turner | 244/218 |
| 2,056,188 A | * | 10/1936 | Hayden | 244/218 |
| 2,076,059 A | * | 4/1937 | Asbury | 244/218 |
| 2,423,095 A | * | 7/1947 | Gibson | 244/218 |
| 2,483,088 A | | 9/1949 | De Haven | |
| 2,844,126 A | | 7/1958 | Gaylord | |
| 3,082,142 A | | 3/1963 | Payne et al. | |
| 3,285,540 A | * | 11/1966 | Lee | 244/218 |
| 3,666,210 A | * | 5/1972 | Look et al. | 244/218 |
| 4,615,260 A | | 10/1986 | Takagi et al. | 92/92 |
| 4,824,053 A | * | 4/1989 | Sarh | 244/218 |
| 4,939,982 A | | 7/1990 | Immega et al. | 92/92 |
| 6,349,746 B1 | | 2/2002 | Bergemann et al. | 138/123 |
| 6,786,457 B2 | * | 9/2004 | Dockter et al. | 244/219 |
| 6,800,351 B1 | | 10/2004 | Pflug et al. | 428/73 |
| 6,908,028 B2 | | 6/2005 | Utsumi et al. | 228/258 |
| 2004/0069906 A1 | * | 4/2004 | Dockter et al. | 244/218 |

(Continued)

OTHER PUBLICATIONS

Daerden, Frank, et al., "Pneumatic Artificial Muscles: Actuators for Robotics and Automation", *European Journal of Mechanical and Environmental Engineering*, vol. 47, 2002; 11 pages.

(Continued)

*Primary Examiner* — Timothy D Collins
*Assistant Examiner* — Philip J Bonzell
(74) *Attorney, Agent, or Firm* — Ober/Kaler; Royal W. Craig

(57) ABSTRACT

An assembly for controlling a vehicle, including a fluid contact surface constructed and arranged to act against a fluid passing over the fluid contact surface; and a support structure coupled to the fluid contact surface. The support structure is constructed and arranged to expand or contract between a first position and a second position, such that a first dimension of the support structure changes during movement of the support structure between the first position and the second position, while a second dimension of the support structure remains substantially constant during the movement of the support structure between the first position and the second position.

29 Claims, 13 Drawing Sheets

U.S. PATENT DOCUMENTS

| | | | |
|---|---|---|---|
| 2004/0069907 A1* | 4/2004 | Dockter et al. | 244/218 |
| 2005/0029406 A1* | 2/2005 | Dittrich | 244/221 |
| 2006/0163431 A1* | 7/2006 | Dittrich | 244/126 |

OTHER PUBLICATIONS

Zhang, Wenqing, et al., "Analysis of Geometrically Nonlinear Anisotropic Membranes: Application to Pneumatic Muscle Actuators", *Finite Elements in Analysis and Design*, vol. 41, 2005, pp. 944-962.

Colbrunn, Robb W., et al., "Design and Control of a Robotic Leg with Braided Pneumatic Actuators", *Proceedings of the IEEE International Conference on Intelligent Robots and Systems*, vol. 4, 2001, pp. 1964-1970.

Kerscher, T., et al., "Joint Control of the Six-Legged Robot AirBug Driven by Fluidic Muscles", *Proceedings of the 3rd IEEE International Workshop on Robot Motion and Control*, 2002, pp. 27-32.

Tondu, B., et al., "A Seven-degrees-of-freedom Robot-arm Driven by Pneumatic Artificial Muscles for Humanoid Robots", *The International Journal of Robotics Research*, vol. 24, No. 4, Apr. 2005, pp. 257-274.

Sawicki, Gregory S., et al., "Powered Lower Limb Orthoses: Applications in Motor Adaptation and Rehabilitation", *Proceedings of the 2005 IEEE 9th International Conference on Rehabilitation Robotics*, Jun. 28-Jul. 1, 2005, pp. 206-211.

Prall, D., et al., "Properties of a Chiral Honeycomb with a Poisson's Ratio of $-1$", *International Journal of Mechanical Science*, vol. 39, No. 3, 1997, pp. 305-314.

Warren, Thomas L., "Negative Poisson's Ratio in a Transversely Isotropic Foam Structure", *Journal of Applied Physics*, vol. 67, No. 12, Jun. 15, 1990, pp. 7591-7594.

Evans, K. E., "Tensile Network Microstructures Exhibiting Negative Poisson's Ratios", *Journal of Physics D: Applied Physics*, vol. 22, 1989, pp. 1870-1876.

Lakes, Roderic, "Foam Structures with a Negative Poisson's Ratio", *Science*, vol. 235, Feb. 27, 1987, pp. 1038-1040.

Choi, J. B., et al., "Non-Linear Properties of Polymer Cellular Materials with a Negative Poisson's Ratio", *Journal of Materials Science*, vol. 27, No. 17, Sep. 1992, pp. 4678-4684, 1 page containing Abstract only.

Choi, J. B., et al., "Non-Linear Properties of Metallic Cellular Materials with a Negative Poisson's Ratio", *Journal of Materials Science*, vol. 27, No. 19, Oct. 1992, pp. 5375-5381, 1 page containing Abstract only.

Friis, E. A., et al., "Negative Poisson's Ration Polymeric and Metallic Foams", *Journal of Materials Science*, vol. 23, No. 12, Dec. 1988, pp. 4406-4414, 1 page containing Abstract only.

Milton, Graeme W., "Composite Materials with Poisson's Ratios Close to $-1$", *Journal of the Mechanics and Physics of Solids*, vol. 40, Issue 5, Jul. 1992, pp. 1105-1137, 1 page containing Abstract only.

\* cited by examiner

CELLULAR SUPPORT STRUCTURES USED FOR CONTROLLED ACTUATION OF FLUID CONTACT SURFACES

RELATED APPLICATION

The present application is a continuation-in-part of U.S. patent application Ser. No. 11/502,360, filed Aug. 11, 2006, entitled "Fluid Driven Artificial Muscles as Mechanisms for Controlled Actuation," which is hereby incorporated by reference herein in its entirety.

STATEMENT REGARDING FEDERALLY SPONSORED RESEARCH OR DEVELOPMENT

This invention was made with U.S. Government support under Contract No. FA9550-06-C-0132, awarded by AFOSR. The U.S. Government has certain rights in this invention.

BACKGROUND OF THE INVENTION

1. Field of Invention

The present invention relates to the manipulation of fluid contact surfaces in vehicles for controlled actuation. More specifically, the invention relates to apparatus and methods employing a zero Poisson cellular support structure to articulate the effective control of a fluid contact surface of a vehicle.

2. Description of Related Art

Since the advent of vehicle flight, methods to obtain improved aerodynamic performance have been under consideration. The ability to maneuver a fixed wing aircraft may be limited by factors related to airfoil design, weight, and flight conditions.

Cellular structures or cellular materials are known in the design of aerodynamic components and devices. Cellular structures provide high compressive strength to weight ratios and the ability to maintain their structure using less expensive materials. For example, cellular structures may be used in the surface layer, or skin, of flight vehicles or in the core of a control surface. Generally, materials such as composite laminates, sheet metal, or foils are used to provide the lightweight yet durable structure.

One known cellular shape is a standard honeycomb. Standard honeycombs are arranged so that each side of an internal unit cell is shared by an adjacent unit cell, one per side for the six bordering unit cells. A honeycomb arrangement is coupled such that the entire honeycomb structure undergoes overall structural deformation in both the primary and transverse directions. The measurement of structural deformation is better defined using Poisson's ratio. Poisson's ratio is defined as the ratio of the negative contracting transverse strain (i.e., normal to the applied load) divided by the extension or axial strain (i.e., in the direction of the applied load). A positive Poisson's ratio indicates that a material will contract laterally when stretched, and expand laterally when compressed (i.e., an increase in length causes a decrease in width). Since typical honeycomb structures suffer a decrease in width when subject to an increase in length, they have a positive Poisson's ratio.

Auxetic structures or materials, on the other hand, are known for their negative Poisson's ratio. Auxetic structures have the opposite (negative Poisson) effect, in that they expand or contract in multiple directions simultaneously to an applied load (i.e., an increase in length causes an increase in width). Examples of auxetic structures may include certain types of foams, polymeric and metallic materials, and composite laminates. Based on their geometry and cellular arrangement, the most common honeycomb-like auxetic structures are often referred to as re-entrant honeycombs.

Generally, manufacturing techniques of honeycomb cores include corrugated processes, extrusion dies, entwining of sheet metal, welding, laser bonding, diffusion bonding, and machining foam-filled billets.

Conventional control surfaces have become commonplace in the design of aerodynamic vehicles, particularly aircraft. Historically, these devices have primarily consisted of trailing edge flaps (ailerons or elevons), leading edge devices (slots or slats), elevators, and rudders, which are rigidly fixed in their size and shape.

SUMMARY OF THE INVENTION

One aspect of the invention provides an assembly for controlling a vehicle, comprising a fluid contact surface constructed and arranged to act against a fluid passing over said fluid contact surface; and a support structure coupled to the fluid contact surface, the support structure constructed and arranged to expand or contract between a first position and a second position, such that a first dimension of the support structure changes during movement between the first position and the second position, while a second dimension of the support structure remains constant during the movement between the first position and the second position.

Another aspect of the invention includes a vehicle, comprising a main body portion; a first fluid contact surface coupled to the main body portion and constructed and arranged to act against a first fluid passing over the first fluid contact surface; and a support structure coupled to said fluid contact surface, the support structure constructed and arranged to expand or contract between a first position and a second position, such that a first dimension of the support structure changes during movement between the first position and the second position, while a second dimension of said support structure remains constant during the movement between the first position and the second position.

Another aspect of the invention includes a method of controlling a vehicle, comprising: coupling a support structure to a fluid contact surface that is constructed and arranged to act against a fluid passing over the fluid contact surface, and moving the support structure, which is constructed and arranged to expand or contract, between a first position and a second position such that a first dimension of the support structure changes during movement between the first position and the second position, while a second dimension of the support structure remains constant during the movement between the first position and the second position.

Another aspect of the invention provides an assembly for controlling a vehicle, comprising a fluid contact surface constructed and arranged to act against a fluid passing over the fluid contact surface; and a support structure coupled to the fluid contact surface, the support structure comprising at least first and second substantially rigid rib support members and a plurality of substantially resilient linking members; each of the linking members comprising a first end and a second end, the first end connecting to the first rib support member and the second end connecting to the second rib support member, the support structure constructed and arranged such that the linking members expand or contract between a first position and a second position, such that a first dimension of the support structure changes during movement between the first position and the second position, while a second dimension of the support structure remains constant during the movement between the first position and the second position.

Other objects, features, and advantages of the present invention will become apparent from the following detailed description, the accompanying drawings, and the appended claims.

BRIEF DESCRIPTION OF THE DRAWINGS

The accompanying drawings facilitate an understanding of the various embodiments of this invention. In such drawings.

DETAILED DESCRIPTION OF THE INVENTION

Inspired by individual features of the above-mentioned negative and positive Poisson effect of structures, the present invention includes a control assembly that organizes a cellular support structure to achieve essentially a "zero Poisson" effect, such that the area of the structure is increased or decreased by a change in position in one direction (e.g., the length) with no change to the structure in the transverse direction (e.g., the width). Additionally, the control assembly of the invention is designed to be resilient to minimize actuation requirements, but maintain out-of-plane stiffness to meet the needs of an aerodynamic structure. A morphing structure or vehicle is one in which the aerodynamic or hydrodynamic surfaces smoothly deform, or morph, into different conformal shapes to alter its respective performance (e.g., control the vehicle, such as direction or vibration), and to increase maneuverability and stability. Vehicle performance, efficiency, and adaptability can be considerably increased through the implementation of morphing or control surface systems in accordance with the present invention. These systems can command authority, for example, over a vehicle's general shape or planform, lift and drag characteristics, as well as its roll, pitch, and yaw moments. The use of morphing systems or control surface systems in accordance with the present invention in aircraft not only offers multi-mission performance optimization, but also expands the flight envelope, while maintaining vehicle stability and control.

Figure 1:
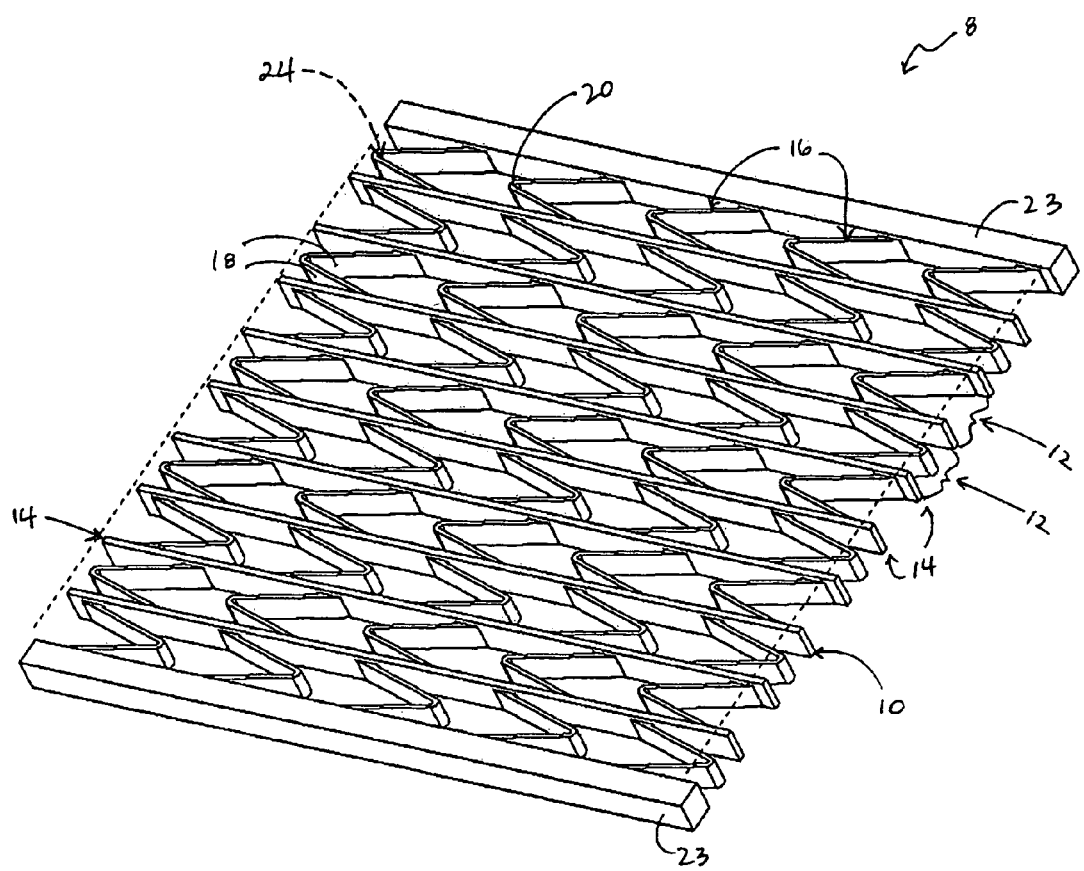
FIG. 1 shows a control assembly in accordance with an embodiment of the present invention.

FIG. 1 shows a control assembly 8 in accordance with an embodiment of the present invention, that includes a support structure 10 coupled, for example, to a fluid contact surface 24, such as a flexible, resilient skin. The support structure 10 comprises at least one substantially rigid rib support member 14 and a plurality of substantially resilient linking members 16. The rib support members 14 are arranged in a substantially parallel configuration to each another. The linking members 16 are connected to and between corresponding rib support members 14.

Figure 2:
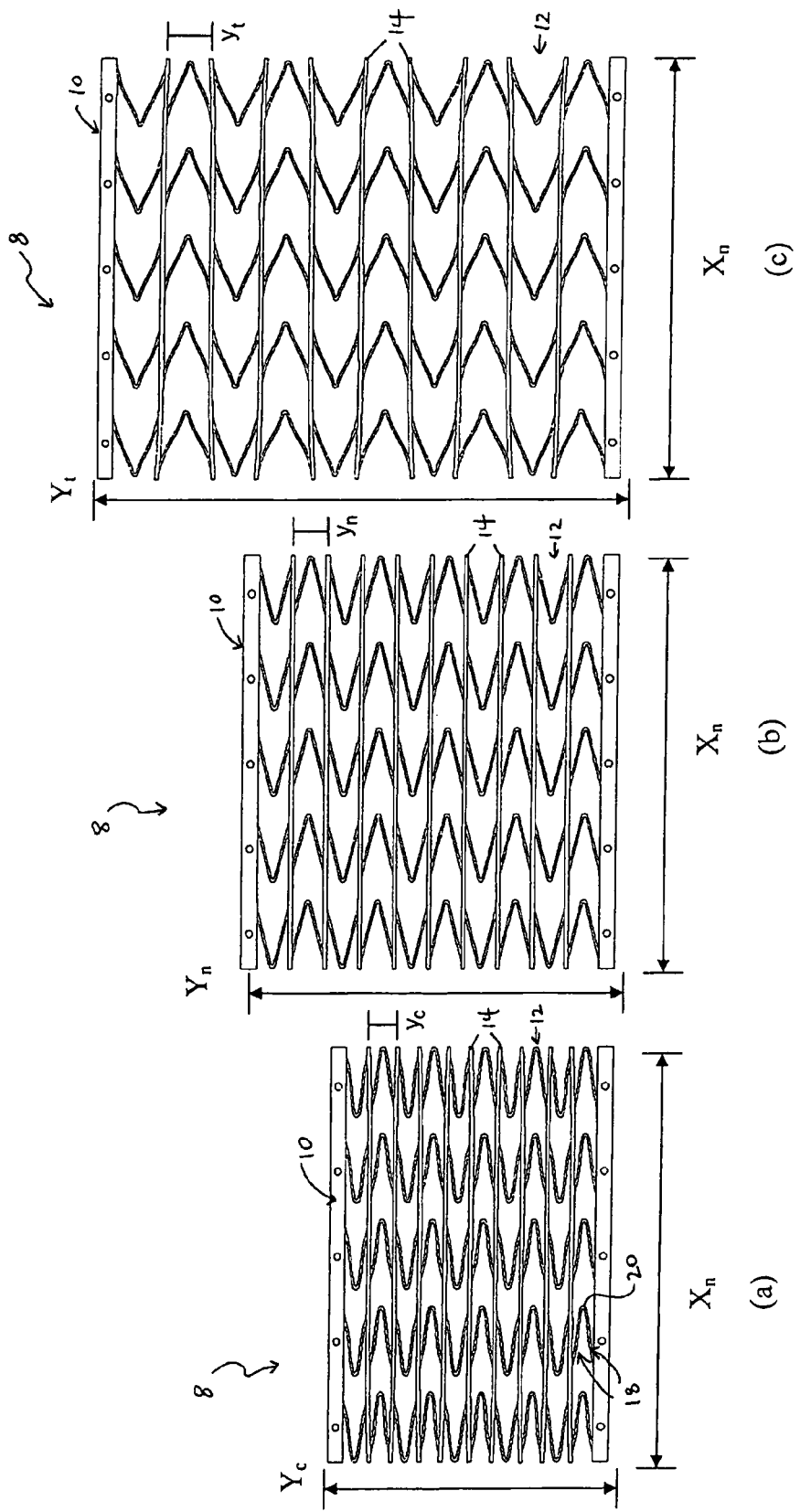
FIGS. 2a, 2b, and 2c illustrate the method of expanding and contracting the support structure of FIG. 1 in a first and second direction (y- and x-direction)
Figure 3:
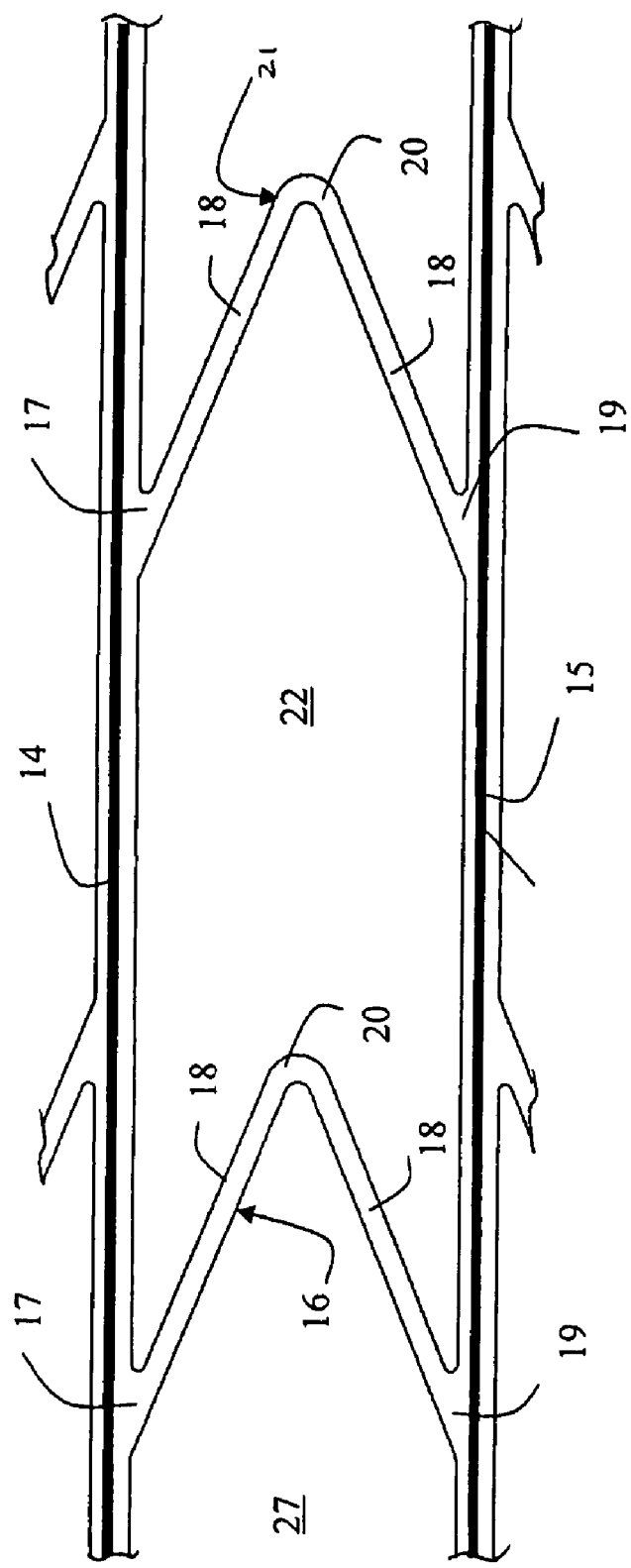
FIG. 3 shows a detailed view of a cell formed from rib support members and linking members in accordance with an embodiment of the present invention.

Linking members 16 may take various forms, including those as described herein below. In support structure 10 the linking members 16 comprise legs 18 with each having a first end 17 and second end 19. Legs 18 are connected at joint 20. As shown in FIGS. 1-3, linking members 16 may be designed to be generally V-shaped, such that the linking members 16 open in a direction that is away from joint 20, i.e., the spacing between legs 18 increases as the legs 18 extend away from joint 20.

The support structure 10 also comprises a plurality of rows 12. The linking members 16 are connected to rib support members 14 to form a row 12 in the support structure 10. Any number of rows 12 or rib support members 14 may be used to form the support structure 10. Furthermore, any number of linking members 16 may be used to connect the rib support members 14 in a parallel configuration to each other in each row 12. As shown, each row 12 may share a rib support member 14 with an adjacent row (i.e., each rib support member 14 is connected at the top and bottom by linking members 16).

The rib support members 14 work in cooperation with the linking members 16 to allow for resilient flexibility or deformation in a first direction (e.g., in a y-direction). However, the rib support members 14 provide support to the structure 10 in that they may be substantially rigid and designed to prevent undesirable out-of-plane bending or loading (e.g., in a z-direction). The rib support members 14 are designed such that they maintain their length and parallel arrangement in the transverse direction (e.g., in an x-direction). In an alternate embodiment, as described in FIG. 8, the rib support members 14 may be designed to allow for out-of-plane bending in another direction, such as in a z-direction.

The above-described support structure 10 has a Poisson's ratio of substantially zero. That is, the support structure 10 allows for dimensional change to occur in the first direction (the y-direction of FIG. 2) while maintaining a constant dimension in the transverse or second direction (the x-direction of FIG. 2).

Additionally, first and second ends 17, 19 and joint 20 of linking members 16 may also be flexible and resilient. The flexibility of the ends 17, 19 and joint 20 allows for additional expansion or contraction of the support structure 10 (such as, e.g., in an accordion-like motion) in a given direction or directions. During contraction, the linking members 16 flex or deform using joint 20 to actively flex the legs 18 toward each other (i.e., decrease the angle between the linking members 16). The legs 18 and first and second ends 17 and 19 may flex toward the rib support members 14. During expansion, the linking members 16 flex or deform from joint 20 to actively flex legs 18 away from each other (i.e., increase the angle between the linking members 16). The legs 18 and first and second ends 17 and 19 may also bend away from the rib support members 14. Further description of the flexibility of the linking members 16 is provided with respect to FIGS. 2a-2c.

The support structure may be formed in a variety of ways and in a variety of configurations. Although illustrated generally as a honeycomb-like structure, support structure 10 may take various other forms. The support structure 10, including the rib support members 14 and the linking members 16, may be formed from a variety of materials including various composite materials that are structured and arranged to provide the described zero Poisson effect.

Figure 10:
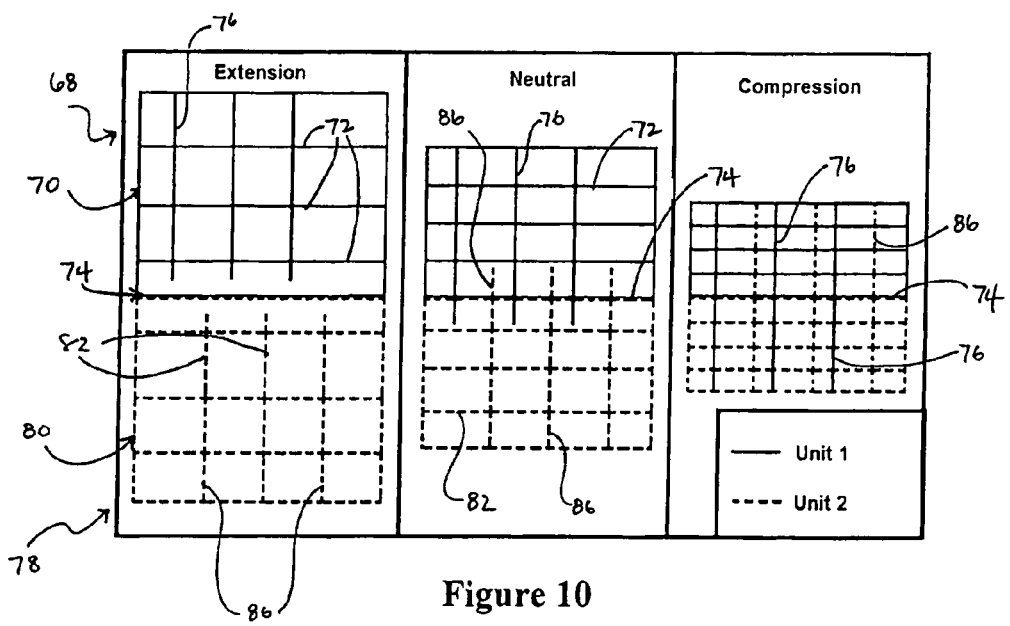
FIG. 10 shows the interaction of the support members for two support structures that are assembled together, in accordance with an embodiment of the present invention.

Support structure 10 may also comprise end support members 23 at either end thereof. Like rib support members 14, end support members 23 may be substantially rigid and in a substantially parallel configuration with the rib support members 14 in the structure 10. End support members 23 may act as a method of securement for the structure 10. For example, end support members 23 may be used as an attachment location for mounting the support structure 10 to a vehicle, or for attaching an actuating mechanism to the support structure 10. End support members 23 may also be used to attach multiple support structures 10 to each other, such as in a row as shown in FIG. 10.

Since the fluid contact surface 24, or skin, is coupled to the support structure 10 as an external layer, it may move relative to the support structure 10. The fluid contact surface 24 may consist of any type of material, such as passive materials (e.g., elastomers, polymers, scales, composites, etc.) or active materials (e.g., shape memory polymers, shape memory fabrics, etc.). In one embodiment, an elastomeric morphing skin is used. The elastomeric morphing skin may be of composite construction wherein such things as unidirectional fabric fibers or rods may be sandwiched between layers of elastomeric material. The skin 24 may be oriented such that the length of the fabric fibers are positioned perpendicularly to the first direction for dimensional change (i.e., the fibers are positioned in the same direction as the rib members). The perpendicular alignment of the composite fibers as described helps maintain a constant dimension in the second direction as the area of the skin 24 is increased or decreased in the first direction. The surface 24 may be employed in the form of a flexible, resilient skin that is sufficiently resilient to automatically move the support structure 10 back to an original position after being moved to a displaced position by an actuation mechanism or device. In other embodiments, an actuation mechanism may also be used to return surface 24 to its neutral or original position (e.g., before displacement). Additionally, actuation mechanisms and resilient skins may be used in combination to return surface 24 to its neutral or original position.

A basic mode of operation of the support structure 10 is illustrated in the x- and y- direction as shown in FIGS. 2a, 2b, and 2c. In the Figures, the support structure 10 changes its shape by increasing area (e.g., expanding from a first position to a second position) or decreasing area (e.g., contracting from a first position to a second position). More specifically, FIGS. 2a-2c illustrate the benefit of a "zero Poisson" support structure, in that the local deformation of the linking members 16 is combined to give an overall deformation change, with respect to the entire structure 10, in one direction.

FIG. 2b illustrates what may be called, for purposes of the illustrated example, a neutral position of the support structure 10 (though not necessarily a neutral position of the fluid contact surface 24), wherein support structure 10 has a first dimension (e.g., length) of $Y_n$ and a second dimension (e.g., width) of $X_n$. Each row 12 in the support structure 10 is also in a neutral position, and the rib support members 14 in each row 12 are spaced $y_n$ from each other. FIG. 2a illustrates the contraction of the support structure 10, which may occur through the use of an appropriate actuator. The total area of support structure 10 decreases due to the decrease in the first dimension (y-direction); specifically, the first dimension decreases to $Y_c$ as the space between the rib support members 14 decreases to $y_c$. During contraction, the linking members 16 flex at joint 20 and the ends 17 and 19 of the legs 18 are compressed towards each other (i.e., decreasing the angle between the legs 18). As the legs 18 move towards each other, the corresponding rib support members 14 connected to the linking members 16 also move towards each other, thus reducing the space of each row to $y_c$. In the illustrated embodiment, although minor deformation may occur along rib support members 14, they remain substantially straight and substantially parallel. The second dimension, $X_n$, therefore, does not substantially change and remains substantially constant at the neutral position.

Likewise, when the support structure 10 is subject to expansion as shown in FIG. 2c, the total area of the support structure 10 increases due to the increase of the first dimension to $Y_t$. As the legs 18 flex away from each other and open further, the legs 18 extend away from the joint 20 (i.e., increasing the angle between the legs 18) and the spacing between each of the rib support members 14 increases to $y_t$. Again, the second dimension of the support structure 10 remains substantially constant at $X_n$.

Although the above support structure 10 has been described with reference area or dimensional change in the y-direction and maintaining a substantially constant dimension in the x-direction, the support structure may alternately have a dimensional change in any first direction while remaining substantially constant in a second direction. In another embodiment, as described in FIG. 8, the support structure has a cellular orientation and design that may be tailored for controllable flexibility in all directions (e.g., in the z-direction).

FIG. 3 shows a detailed view of a cell 22 of a support structure 10 formed from rib support members 14 and linking members 16 in accordance with an embodiment of the present invention. First linking member 16 is connected to rib support members 14 and 15 using ends 17 and 19, respectively. Second linking member 21 is connected to rib support members 14 and 15 using ends 17 and 19, respectively. Thus, the connections define an internal space 22, or enclosed cell 22, therein. As illustrated, the cell 22 comprises six sides, thus forming a hexagonal unit.

Cell 22 may share linking member 16 with an adjacent cell in the row 12. Also, cell 22 may share rib support member 14 with one or more cells in the next row 12. A row 12 may comprise any number of cells 22. Further, the support structure 10 may comprise any number of cells 22. In one embodiment, a plurality of cells 22 is provided to form a honeycomb-like structure, as seen in FIG. 1.

The cells may also be open, as depicted by cell 27 in FIG. 3. Open cell 27 may be formed on an end of the support structure 10 or row 12, for example. Cell 27 may be formed from the connecting relationship of a linking members 16 and the rib support members 14, 15.

Figure 12:
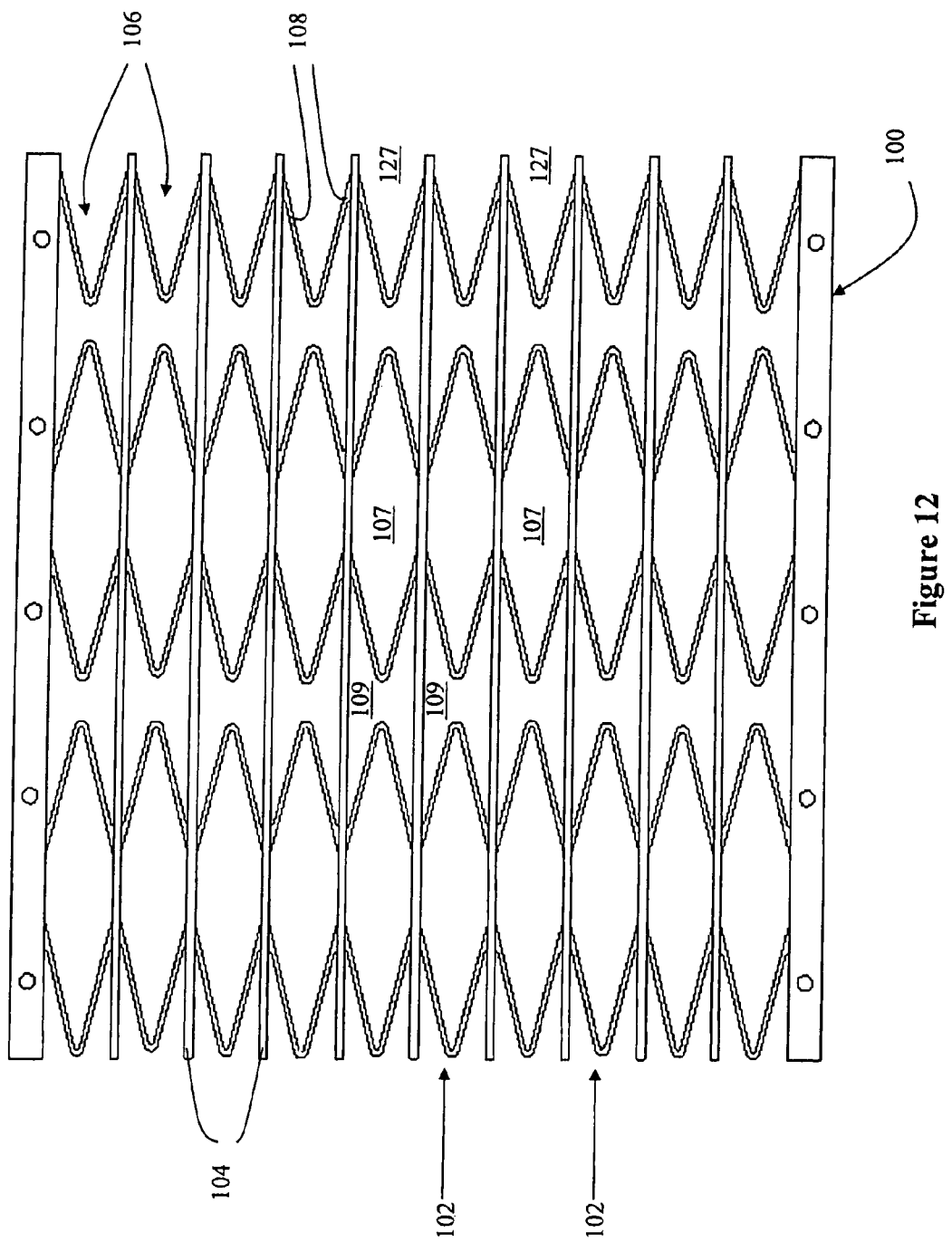
FIG. 12 illustrates a support structure with an alternate cellular arrangement in accordance with an alternate embodiment of the present invention.
Figure 13:
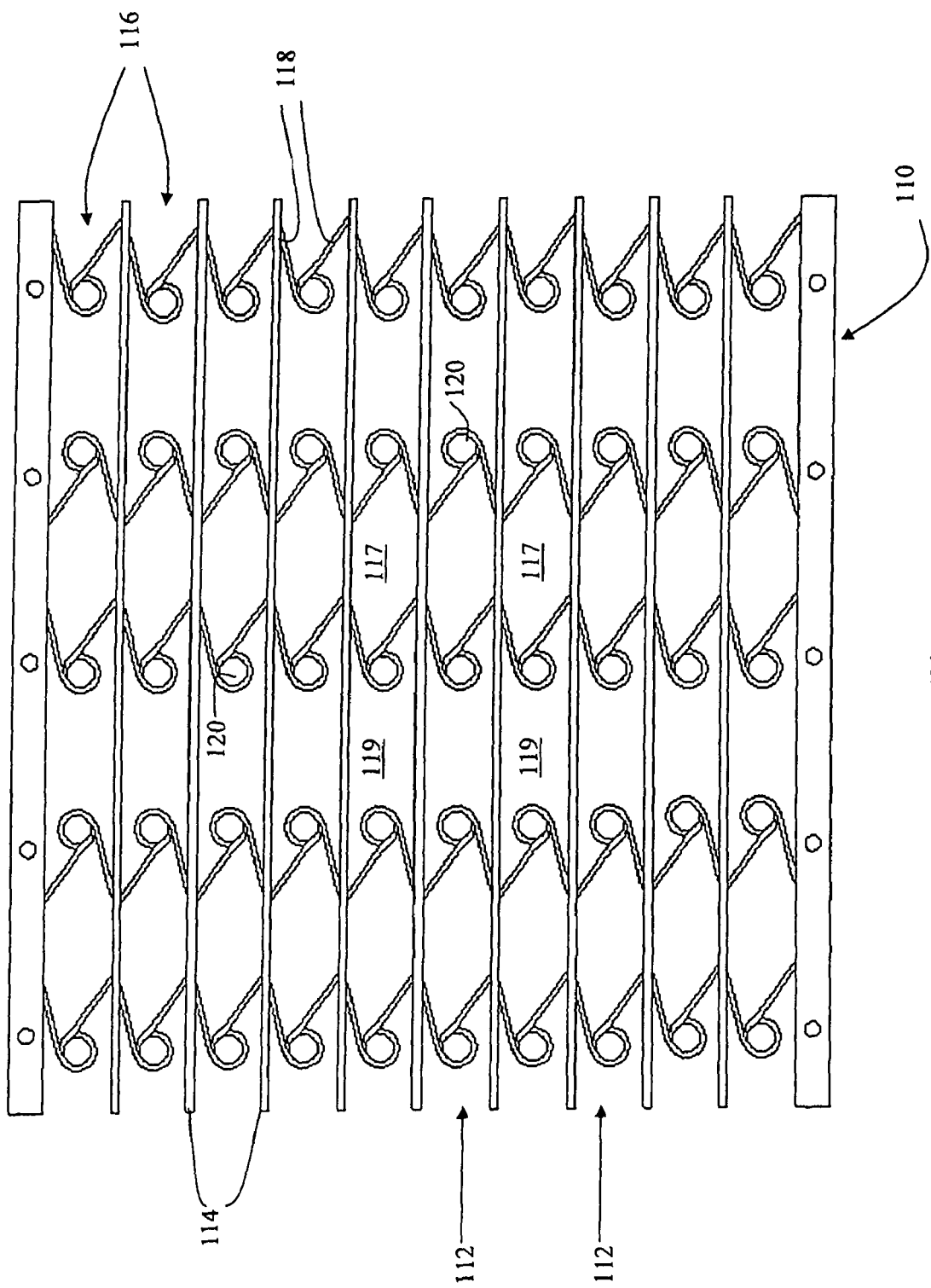
FIG. 13 illustrates an additional support structure with a chiral cellular arrangement in accordance with an embodiment of the present invention.

However, the design of the linking members (or cells) in the support structure is not meant to be limiting. Alternate polygonal shapes or configurations may also be used for the linking members, including, for example, semi-circular or arch-like configuration. Also, any number of sides or linking members may form an enclosed cell. FIGS. 12 and 13 illustrate some of the alternate configurations of linking that may be used to form cells.

Figure 4:
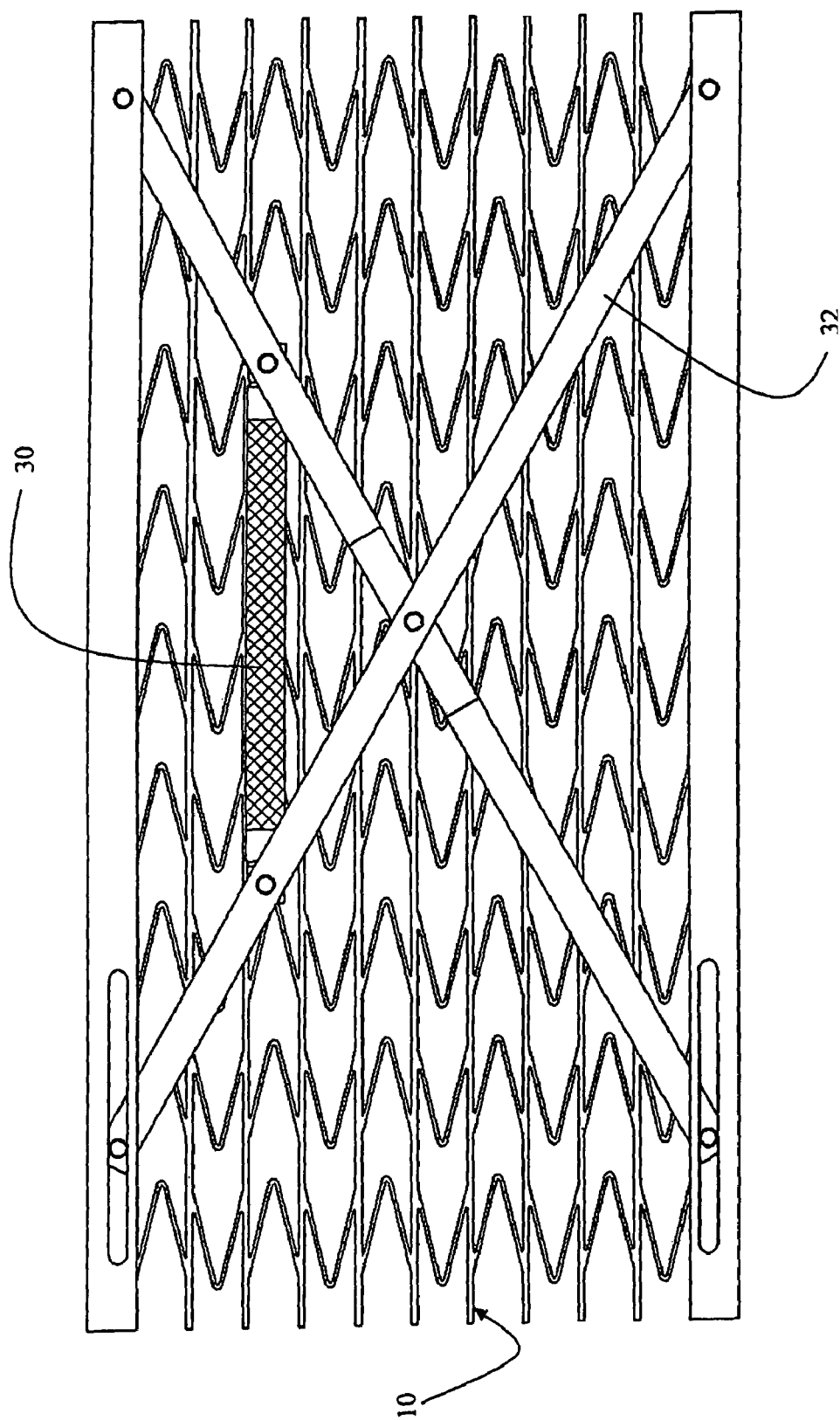
FIG. 4 illustrates a support structure with an actuating mechanism for expanding and contracting the support structure in accordance with an embodiment of the invention.

As previously described, the "zero Poisson" control assembly may be used in morphing or control surface systems of vehicles. The systems, for example, may provide the ability to manage or control vibration that may be detrimental to mechanical components of a vehicle. For example, the system may be employed to decrease vibration, maintain vibration, or increase vibration, as desired. Further, the systems may also be used for controlling the direction of a vehicle. In such instances, the systems may rely on an actuating device and a transfer mechanism to control the fluid contact surface. An actuating device may be utilized, for example, for such directional control and/or vibration control. A representative actuating system to be used with the support structure 10 is illustrated in FIG. 4. An actuating mechanism 30 is used to expand and contract the support structure 10 in accordance with an embodiment of the invention. The actuating mechanism 30 drives area changes in the support structure 10 using the zero Poisson effect in order to control a fluid contact surface of a morphing vehicle, for example. The actuating mechanism 30 works in cooperation with transfer mechanism 32, which is in the form of a supporting X-frame. When the actuating mechanism 30 is activated, the mechanism 30 uses supporting X-frame 32 to transfer energy to the support structure 10, which consequently expands or contracts the support structure 10 in a first direction while the second direction remains substantially constant. As described, expansion or contraction of the support structure 10 thus causes control of the fluid contact surface 24.

Any known or conventional actuation mechanism or system may be used to actuate the support structure 10 of the present invention to control a fluid contact surface 24 for improved characteristics and stability of a vehicle moving through a fluid. For example, some common actuators such as fluid-driven pistons, telescopic devices, gear motors, cranks, etc. may be utilized. Other actuation devices such as active materials, (e.g., shape memory alloys, piezoelectrics, compact hybrid actuators, etc.), and other approaches (e.g., artificial muscles, internal cellular pressure variations, and thermal differentiations) may also be used. U.S. patent application Ser. No. 11/502,360, which has been incorporated by reference herein, disclose actuation mechanisms that may also be employed to move the support structure 10.

The transfer mechanism 32 may be any appropriate transfer mechanism that provides a mechanical advantage and the appropriate transfer of forces from the actuator to the fluid contact surface. The transfer mechanism may take any known configuration, such as levers, pulleys, X-frames, or four-bar linkages.

Optionally, in an embodiment, the actuation system may be augmented with a ratcheting device or lock-out device (e.g., solenoid, spring-loading dowel, or key) to maintain reliability in the event that the system loses power.

Figure 14:
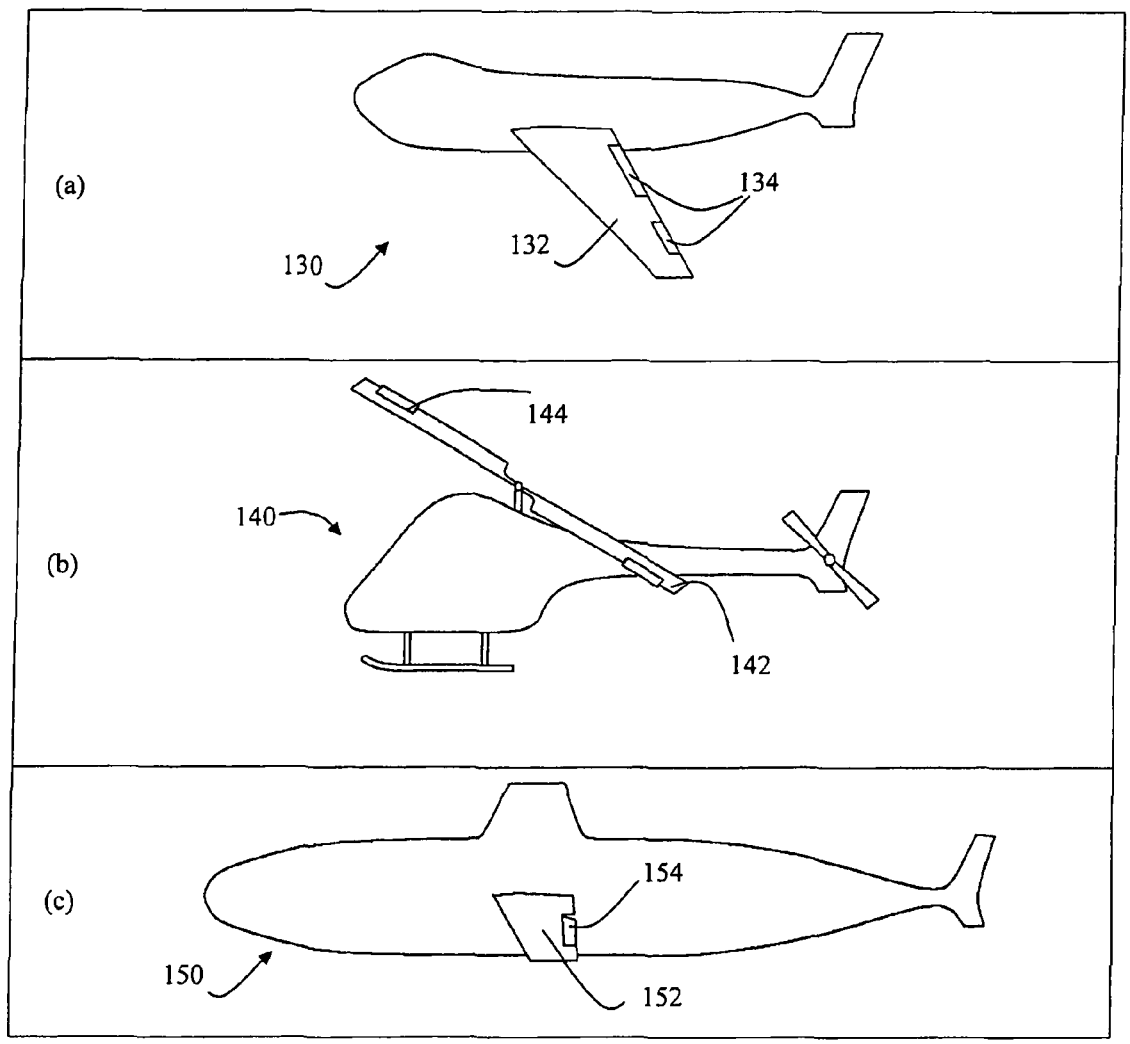
FIG. 14 shows examples of vehicles on which the device of FIG. 1 may be utilized.

The control assemblies 8 may be employed in any type of desired location and on any vehicles, including aircraft, such as, full-scale and unmanned aerial vehicle scale (UAV-scale) vehicles and including fixed-wing and rotorcraft, and watercraft, such as, full-scale and unmanned underwater vehicle scale (UUV-scale) vehicles, and including underwater and above surface vehicles. Three examples of vehicles on which zero Poisson support structures may be employed are an airplane 130, a helicopter 140, and a submarine 150, as shown in FIGS. 14a, 14b, and 14c, respectively, each comprising a main body portion and at least one fluid contact surface and support structure. FIG. 14a shows a control assembly 134 within a wing 132 of airplane 130. FIG. 14b illustrates a control assembly 144 within the blade 142 of the helicopter. The submarine 150 of FIG. 14c illustrates a control assembly 154 within the submarine's fin 152. Although FIGS. 14a-14c generally show the use of a control assembly with flaps, wings, etc., the control assemblies 8 may be also used to control any surface needing such control. For example, the control assemblies 8 may be used to control the extension, camber (or arching), twisting, etc. of any number of locations on a vehicle, including the tail, main body portion, or other surfaces.

The control assembly 8 of FIG. 1, may be, for example, any appropriate surface that, when moved, provides control of the vehicle by acting against a fluid passing over the contact surface 24. The control may be in various forms, such as conformal changes, directional control of the vehicle and/or vibrational control of the vehicle or parts of the vehicle. The control assembly 8 may take various forms, including a fluidfoil, aerofoil, or hydrofoil. For example, the control assembly 8 may form part of a flap, slat, aileron, elevator, rudder, wing, fin, etc. The control assembly 8 may constitute the entire element, such as an entire elevator or rudder, tab, or brake, or it may constitute a portion of such an element, depending on the desired application.

Figure 5B:
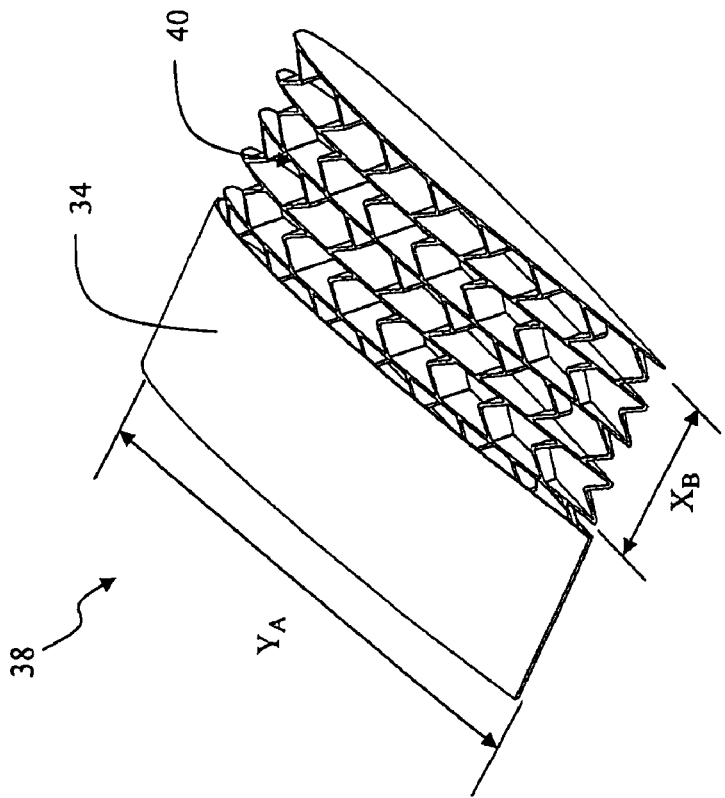
FIGS. 5a and 5b illustrate a support structure in use as a core for a wing tip control surface in accordance with an embodiment of the present invention.
Figure 5A:
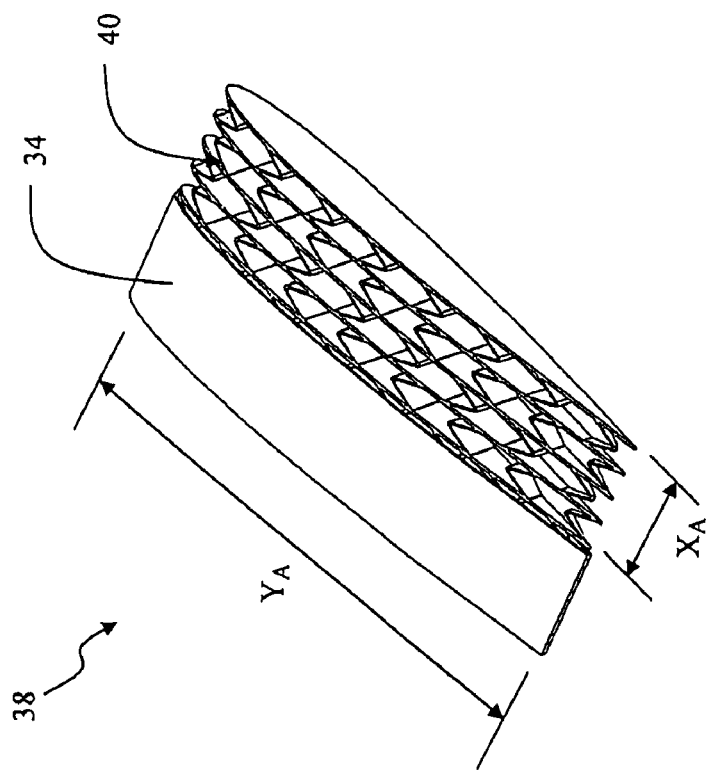

FIGS. 5a and 5b illustrate a control assembly 38 as a core within a fluid contact surface 34, such as a wing tip. FIG. 5a shows the control assembly 38 with an internal support structure 40 with a first dimension $X_A$ representing the span of the wing, and a second dimension $Y_A$ representing the chord of the wing. The support structure 40 is provided such that the rib support members are oriented in line with the chord of the wing, to allow for adjustment of the wing span. FIG. 5b illustrates a method for expanding the support structure in a first direction X (e.g., for increasing the wing span). Specifically, the support structure 40 is expanded from a first position to a second position in the x-direction, such that the first dimension increases from $X_A$ to $X_B$. The second dimension, or chord of the wing, remains substantially constant at $Y_A$.

Figure 6B:
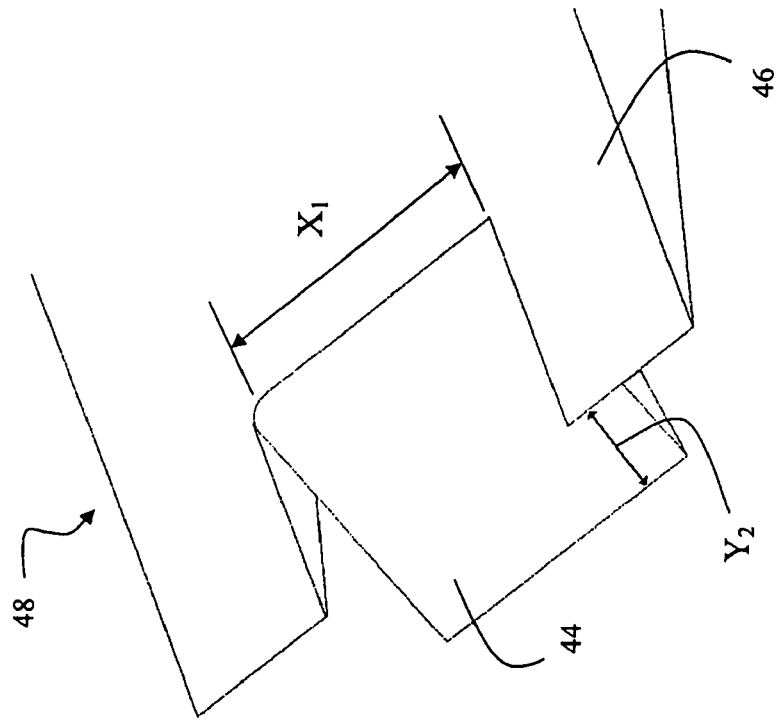
FIGS. 6a and 6b illustrate a support structure in use in a flap control surface in accordance with an embodiment of the present invention.
Figure 6A:
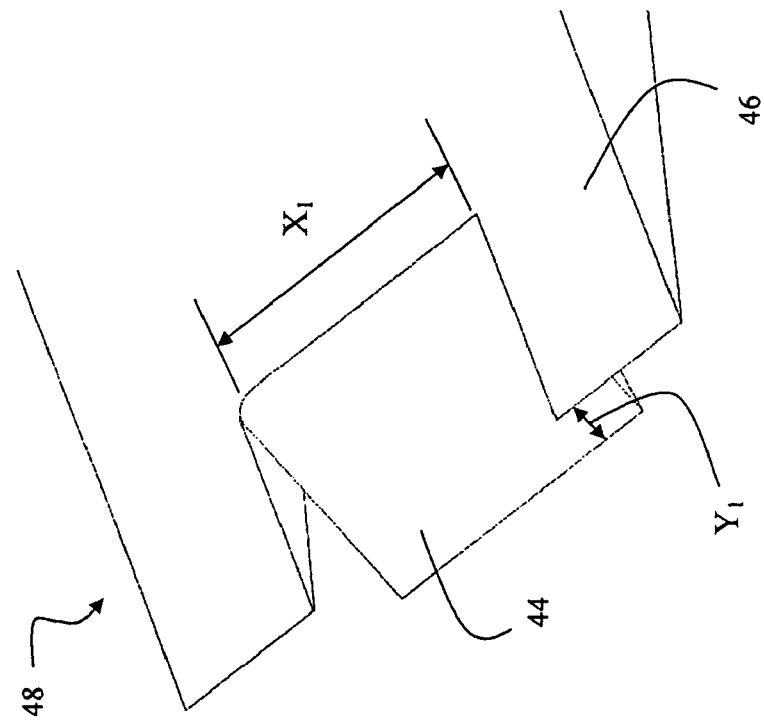

FIGS. 6a and 6b illustrate a control assembly 48 of an alternate embodiment positioned within a fluidfoil 46, such as an aerofoil or hydrofoil. The fluid control surface 44 may be a standard aileron or discrete control flap whose internal core is made of a support structure (as described above) with the rib support members oriented along the span, for example. In such an arrangement, the flap 44 may be deflected as usual, but additional control may also be provided when the chord of the flap is increased from $Y_1$ to $Y_2$. The span of the flap remains at a constant dimension $X_A$.

The above described support structures may be constructed using any number of techniques including, but not limited to, rapid prototyping, molding, or casting. Also, materials that may be used for the support structure may include, but should not be limited to, thermoset and thermoplastic plastics, impregnated papers (e.g., Nomex), aluminum, silicone elastomers, natural rubbers, polyurethanes, and photopolymers.

Figure 7:
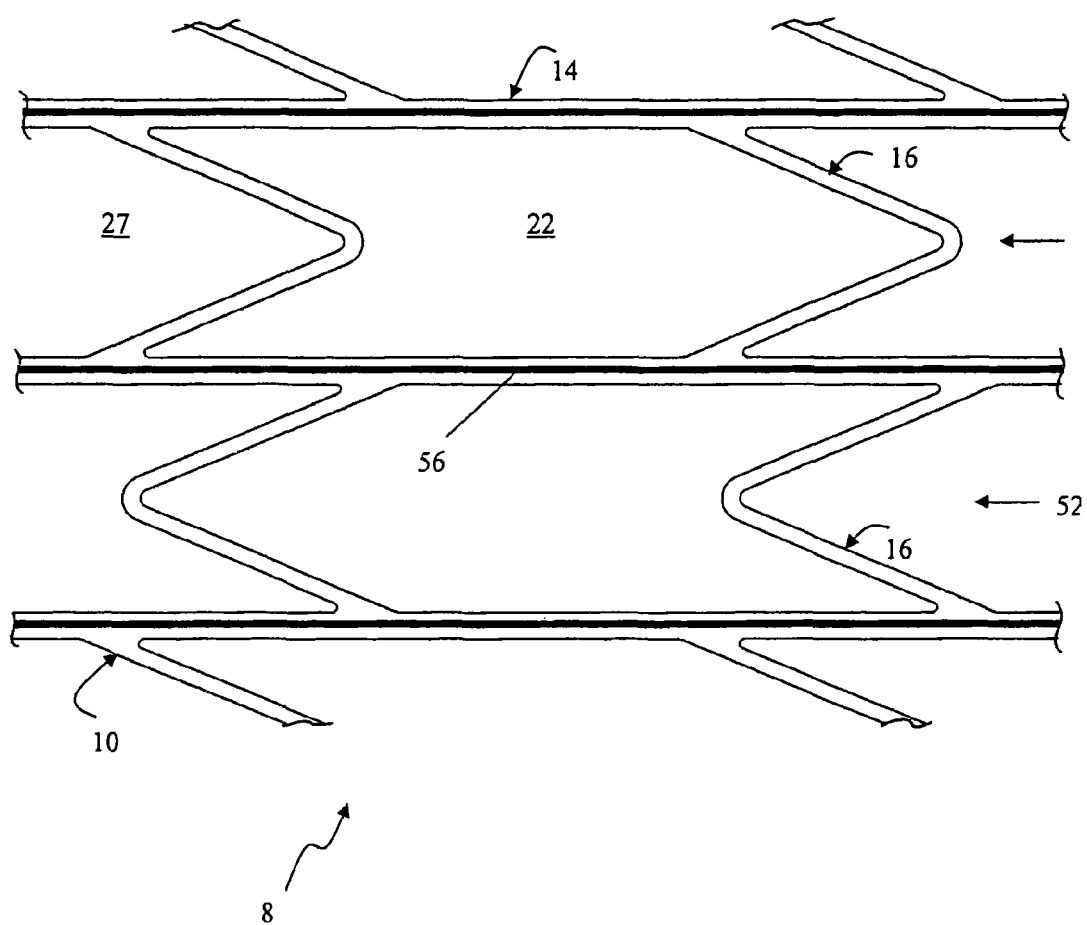
FIG. 7 shows a detailed view of the construction of a support structure in accordance with an alternate embodiment of the present invention.

In addition, alternate machining and assembly methods may also be used. For example, the support structure may be formed as a single unit, or as multiple, articulated components that are joined together. As shown in FIG. 7, the support structure may also have a composite reinforced assembly. Specifically, a first row 50 and a second row 52 may be each produced as a single unit and then joined together with other rows to form a support structure 10 of the control assembly 8. The rib support members 14 may be formed as composite sandwich structures for added out-of-plane stiffness (e.g., in the z-direction) For example, rows 50 and 52 may be molded, and rib support members 14 may comprise a reinforced composite rib 56 between first and second rows 50 and 52. Alternatively, the linking members 16 may also be of similar construction. In other embodiments, the linking members 16 may be assembled as composites with active materials, such that the joints 20 may be actuated directly by respective active materials. The composite reinforced assembly may be made of materials such as those listed above, either individually or together.

In an alternate embodiment, a number of enclosed cells, such as cells 22, may be formed as individual units and then joined together using known methods (e.g., adhesive, co-curing, etc.) to form a support structure of the control assembly.

The fluid contact surfaces, such as fluid contact surface 24, may comprise materials such as silicone elastomers, natural rubbers, shape memory polymers, and composite reinforced versions of any of the above, including sandwich structures, embedded chopped fibers, etc., for example.

Figure 8:
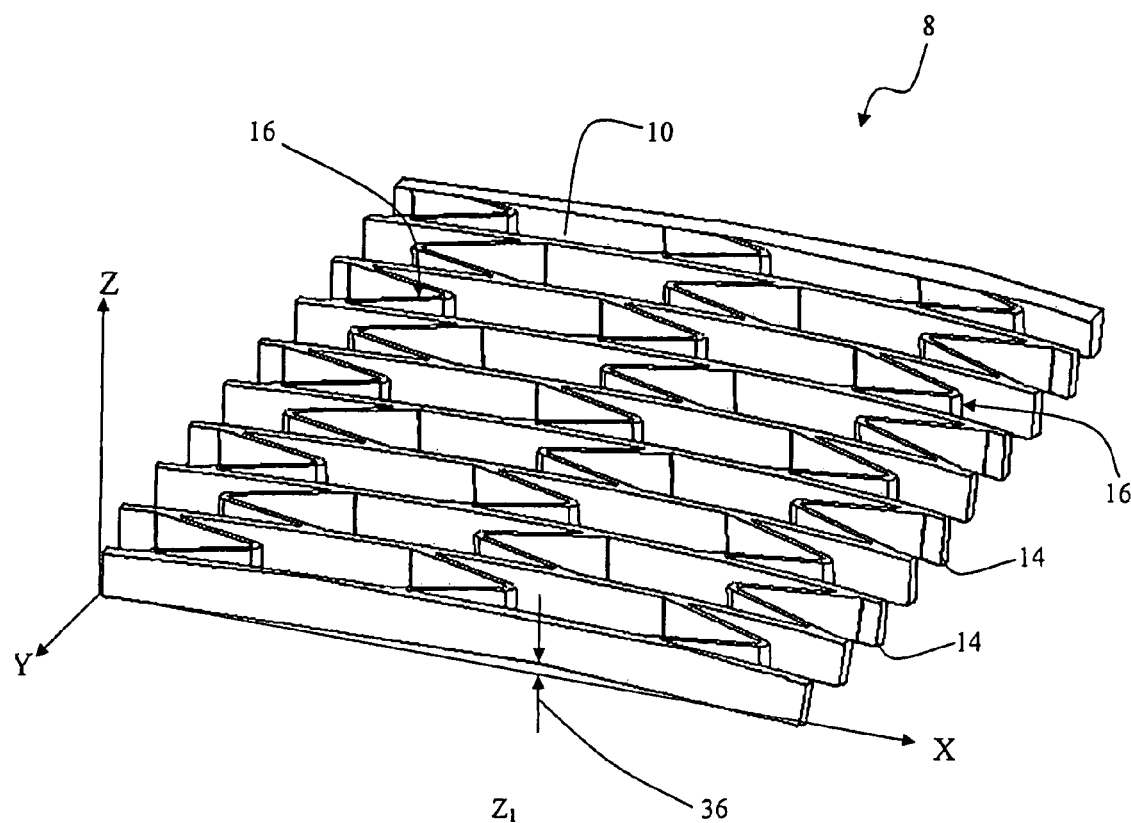
FIG. 8 illustrates a support structure with active rib members for movement in a third direction (z-direction), in accordance with an alternate embodiment of the present invention.

Although the above support structures are described as being designed to be moved from a first position to a second position in one direction and not in a second direction, in an alternative embodiment, the support structure 10 has a cellular arrangement and design that may be tailored for controllable flexibility in all directions (e.g., in the z-direction), such that the support structure may bend out-of-plane. As shown in FIG. 8, the control assembly 8 may be constructed to have actuation properties along another direction, such as the z-direction. In FIG. 8, a displacement distance 36 is illustrated in the z-direction. Thus, the rib support members 14 of the support structure 10 may have the capability to flex out-of-plane to allow for a vehicle to be controlled using a variety of complex shapes, including variable twist and camber. For example, the control assemblies 8 may be provided at particular locations along an aerodynamic surface or along an entire surface to enhance the possibilities of control.

The rib support members 14 of support structure 10 may be made active by applying known materials to each member (e.g., shape memory effect materials, bending beams with piezoelectric patches, etc.).

Figure 9:
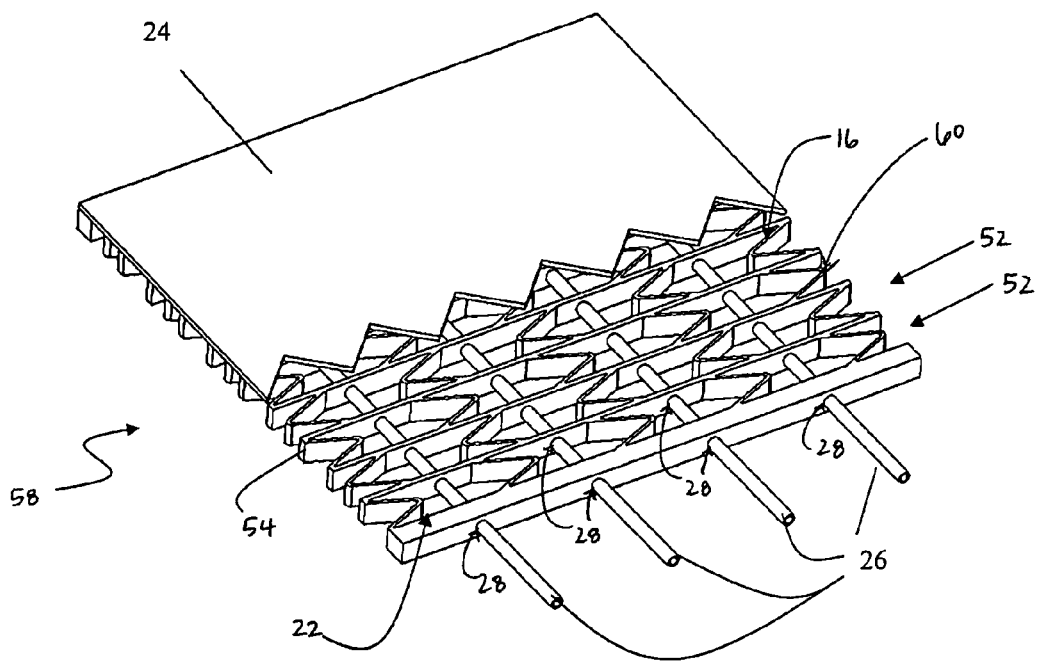
FIG. 9 shows a perspective view of a support structure assembly with supporting rods in accordance with an embodiment of the present invention.

Generally, the support structure 10 is designed to be flexible in the desired first direction (e.g., in a y-direction) and the ribs 14 are designed to be stiff in the second direction (e.g., in an x-direction). However, additional support may be required in the out-of-plane direction (e.g., in the z-direction), particularly if out-of-plane bending (such as described above in FIG. 8) is not desired. To provide additional support and prevent out-of plane bending, sliding support rods 26 may be employed in a control assembly 58, as shown in FIG. 9. Specifically, the support rods 26 may be fed through openings 28 in the rib supporting members 54 of the support structure, through a plurality of rows 62 and cells 22 in the support structure 10, such that they are substantially perpendicular to the rib supporting members 54. Support rods 26 also serve as a guide for the expansion and contraction motion of the support structure 60. Although the support rods 26 are shown through each of the rows 62 and cells 22 in the support structure 10 of FIG. 9, the support rods 26 may be provided through any number of the rows 62 or cells 22.

Though the support rods 26 are shown as being of a fixed length, any similar rod, tube, or structure may be used to improve or support the support structure 60 of a control assembly 58. For example, telescopic rods or tubes may be employed.

The morphing systems of FIGS. 5a, 5b, 6a, 6b, and 9 may be designed for a change in a first direction that is greater than 100%, thus requiring an area change of greater than 100%, which makes the described support structure attractive for a variety of systems. Certain design circumstances may require several support structures in a side by side relationship, rather than a single structure for an entire surface. For example, when considering the span change of a wing on an airplane, using multiple support structures would allow for the ability to extend or compress only the necessary sections required by the aerodynamics of the desired configuration.

For an embodiment with support structures with support rods, multiple control assemblies 8 may be successfully employed by offsetting them from those adjacent in the unit. FIG. 10 illustrates an embodiment where a plurality of control assemblies 68 and 78 are used in cooperation with each other. The control assemblies 68 and 78 comprise support structures 70 and 80 and are connected at a joint 74 to each other. The support rods 76 of support structure 70 and the support rods 86 of the support structure 80 are offset from each other, such that the rods 76, 86 do not interfere with each other in any of the configurations (i.e., in a neutral, compressed, or extended configuration). The control assemblies 68 and 78 may be designed similarly to those of FIG. 9; however, additional openings to accommodate the sliding support rods 86 through the rib support members 72 of the support structure 70, and openings to accommodate the sliding support rods 76 through the rib support members 82 of support structure 80 would also be provided.

Figure 11:
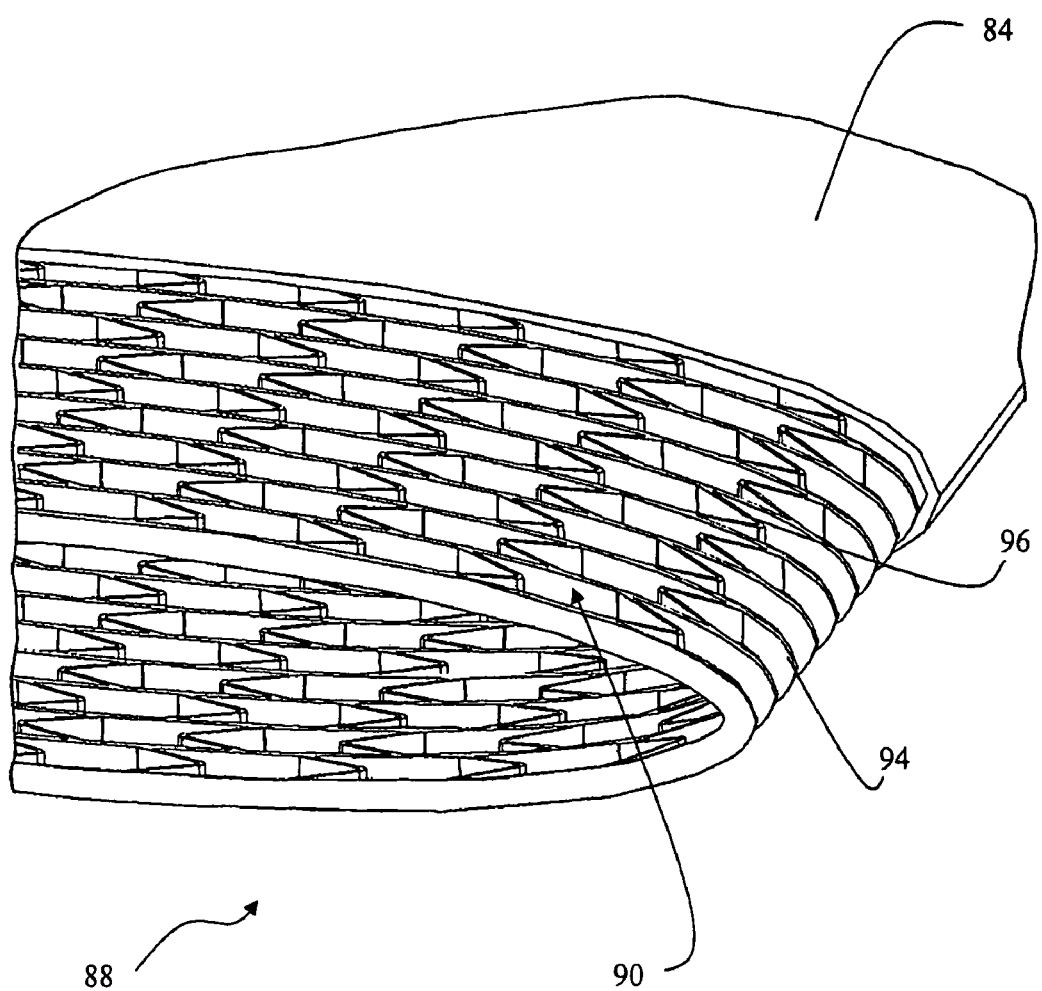
FIG. 11 illustrates a support structure in an alternate configuration for use in accordance with an embodiment of the present invention.

Alternatively, the fluid contact surface 24 may also be implemented in other configurations in relation to the support structure 10 other than a core. For example, a fluid contact surface may be used as a sleeve or sheath to surround the support structure as shown in FIG. 11, or the support structure may be embedded in a matrix of skin material. In FIG. 11, the control assembly 88 is designed to follow a desired contour or profile, such as that of a fluid foil. As shown, the support structure 90 comprises a plurality of rib support members 94 and linking members 96. The rib support members 94 follow the contour or profile of the fluid foil. A fluid contact surface 84 is provided around the support structure 90 to follow the same desired contour or profile, such that it moves in relation to the movement of the support structure 90.

Also, in other embodiments, the linking members 96 of FIG. 11 may or may not be aligned perpendicularly to the tangent of the fluid foil at each position along the profile of the fluid foil.

As shown in FIGS. 1 and 2, each row 12 of the support structure 10 may have linking members 16 that are oriented to face the same direction, which form the enclosed cell 22. However, as noted above, the design of the linking members or cells in the support structure is not meant to be limiting. For example, two alternate cellular configurations of support structures with a zero Poisson ratio are shown in FIGS. 12 and 13. FIG. 12 illustrates a support structure 100 that may be used in a control assembly with a fluid contact surface, comprising a plurality of rows 102 wherein the direction of the linking members 106 is alternated within the row 102; that is, the linking members 106 may be designed to form a "standard" hexagonal cell, as depicted by 107, wherein the open ends of the legs 108 are designed to face each other. As noted above, cell 107 is formed from the connecting relationship of two linking members 106 and the rib support members 104 they are connected to, forming an enclosed cell 107 with six sides of standard hexagonal configuration. Additionally, the area between or adjacent each standard hexagonal cell 107 may also be an enclosed cell. That is, next to each standard hexagonal cell 107 is a re-entrant hexagonal cell 109 (i.e., hexagons with side members turned inwardly) formed from the shared rib support members 104 and linking members 116. Cell 127 is an open cell that is formed from the connecting relationship of a linking member 106 and the rib support members 104. Cell 127 may be along the end of the support structure 100 or at the end of a row 102, for example. The cells 107, 109, and 127 are arranged such that the linking members 106, despite their direction, expand or contract between a first position and a second position as previously described, wherein a first dimension of the support structure 100 changes during movement between the first position and the second position, while a second dimension of the support structure 100 remains substantially constant during the movement of the structure 100 between the first and second positions.

Aside from common polygonal shapes, additional configurations for linking members may also be employed in the support structure, including, for example, semi-circular and arch-like linking members may be employed. FIG. 13 illustrates an example of one possible arrangement of a support structure 110 in a control assembly, where the legs 118 of the linking members 116 have a shape that is chiral-like, and which do not terminate at a joint (e.g., as shown in FIG. 1), but, rather, terminate in coils 120. The linking members 116 form any number of enclosed cells 117 and adjacent cells 119 in each row 112. Open cells 137 may also be formed in each row 112. The support structure 110 forms a chiral-like honeycomb-like structure that performs in a similar manner as the support structure 10 of FIG. 1 and the structure 100 of FIG. 12.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An assembly for controlling a vehicle, comprising:
    a resilient fluid contact surface constructed and arranged to act against a fluid passing over said fluid contact surface; and
    a cellular support structure coupled to said fluid contact surface and supporting said fluid contact surface against fluid loads applied to the fluid contact surface, said cellular support structure comprising a plurality of rigid elongate support members extending substantially parallel to each other and spaced from each other within a plane, and a plurality of resilient linking members spaced in a row and fixedly attached between each opposing pair of support members, each linking member further comprising a strut consisting of two legs each attached distally to one of said opposing pair of support members and converging to a flexible hinge suspended between said opposing pair of support members, each said opposing pair of support members and row of linking members there between defining a zero-Poisson effect cellular structure of enclosed cells adapted for expansion and contraction along an axis within said plane without dimensional change along an in-plane transverse axis and without dimensional change along an out-of-plane axis;
    said support structure constructed and arranged to expand or contract between a first position and a second position by structural flexing deformation of said linking members at said flexible hinges, such that a first in-plane dimension of said support structure changes during movement of said support structure between said first position and said second position, while a second transverse in-plane dimension of said support structure remains substantially constant during the movement of said support structure between said first position and said second position, and a third out-of-plane dimension of said support structure remains substantially constant during the movement of said support structure between said first position and said second position,
    said fluid contact surface being coupled as an external layer to said cellular support structure for resilient deforming movement along with the support structure,
    wherein said deforming movement of fluid contact surface is such that its resilience exhibits a Poisson's ratio substantially close to zero in-plane with respect to said first and second dimensions of said support structure movement.

2. An assembly according to claim 1, wherein each of said linking members further comprise:
    a first leg coupled to a first support member at a proximal end,
    a second leg coupled to a second support member at a proximal end,
    said flexible joint being engaged to a distal end of said first leg and a distal end of said second leg .

3. An assembly according to claim 1, wherein said linking members are generally V-shaped.

4. An assembly according to claim 1, wherein said cells form a honeycomb-like structure.

5. An assembly according to claim 1, wherein said cells are of any polygonal shape.

6. An assembly according to claim 1, wherein said support members or said linking members include an integral, active actuating mechanism that changes the shape of said support structure.

7. An assembly according to claim 1, further comprising:
    a lock coupled to said support structure to maintain said support structure in a desired position.

8. An assembly according to claim 1, wherein each linking member consists of
    a first leg coupled to said first rib member at a proximal end,
    a second leg coupled to said second rib member at a proximal end, and
    a flexible joint engaged to a distal end of said first leg and a distal end of said second leg.

9. An assembly according to claim 1, further comprising:
    an actuating mechanism coupled to said support structure to flex or deform said support structure enabling the movement of said support structure between said first position and said second position.

10. An assembly according to claim 9, wherein said fluid contact surface is a resilient skin that stretches and contracts with movement of said support structure between the first position and the second position, wherein said stretching and contracting of the resilient skin is done so in a manner that exhibits substantially zero Poisson's ratio with respect to the plane of said support structure movement.

11. An assembly according to claim 10, wherein said fluid contact surface is a composite material.

12. An assembly according to claim 1, wherein said fluid contact surface forms part of a fluidfoil.

13. An assembly according to claim 12, wherein said support structure is positioned within said fluidfoil.

14. An assembly according to claim 12, wherein said support members are in formed in the shape of a fluid foil.

15. A vehicle comprising:
a main body portion;
a first resilient fluid contact surface coupled to said main body portion and constructed and arranged to act against a fluid passing over said first contact surface; and
a zero-Poisson effect cellular support structure coupled to said first fluid contact surface and supporting said first fluid contact surface against loads applied to said first fluid contact surface, said cellular support structure having a length dimension in a first direction and a width dimension in a second direction transverse to said first dimension, said zero-Poisson effect support structure further comprising,
a first rib support member for securing said cellular support structure to said vehicle at a first point and a second rib support member moveable in said first direction relative to said first rib support member for securing said cellular support structure to said vehicle at a second point, said first rib support member and said second rib support member both being oriented in said second direction,
a plurality of enclosed cells linearly arranged in rows at regular intervals and joining said first rib support member with said second rib support member, said cells being formed by
a first linking member fixedly attached between said first and second rib support members, said first linking member further comprising a strut consisting of two legs each attached distally to one of said opposing first and second rib support members and converging to a flexible hinge suspended between said first and second rib support members,
a second linking member fixedly attached between said first and second rib support members, said first linking member further comprising a strut consisting of two legs each attached distally to one of said opposing first and second rib support members and converging to a flexible hinge suspended between said first and second rib support members,
wherein said zero-Poisson effect support structure is constructed and arranged to flex or deform between a first position and a second position by structural flexing deformation of said first and second linking members, such that said length dimension of said cellular support structure changes during said movement of support structure between said first position and said second position, while said width dimension of said support structure remains substantially constant during said movement of said support structure between said first position and said second position, and a third out-of-plane dimension of said support structure remains substantially constant during the movement of said support structure between said first position and said second position, wherein said fluid contact surface is coupled as an external layer to said cellular support structure for resilient deforming movement along with the support structure.

16. A vehicle according to claim 15, further comprising:
an actuating mechanism coupled to said support structure to flex or deform said support structure for enabling the movement of said support structure between said first position and said second position.

17. A vehicle according to claim 15, wherein said support structure forms part of a wing.

18. A vehicle according to claim 15, wherein said fluid contact surface forms part of a fluidfoil.

19. A vehicle according to claim 18, wherein said support structure is positioned within said fluidfoil.

20. A vehicle according to claim 15, wherein said fluid contact surface is a resilient skin that stretches and contracts with movement of said support structure between the first position and the second position, wherein said stretching and contracting of the resilient skin is done so in a manner that exhibits substantially zero Poisson's ratio with respect to the plane of said support structure movement.

21. A vehicle according to claim 20, wherein said fluid contact surface is a composite material.

22. A method of controlling a vehicle, comprising:
coupling a cellular support structure to a resilient fluid contact surface that is constructed and arranged to act against a fluid passing over said fluid contact surface, said cellular support structure comprising
a plurality of rigid rib members extending uninterrupted along a width of said contact surface and defining a plurality of rows there between, and
a plurality of enclosed cells linearly arranged within said plurality of rows at regular intervals and joining each of said plurality of rib members with each adjacent rib member, said cells formed by
a first linking member fixedly coupled at a first end to a first of said plurality of rib members and fixedly coupled at a second end to a second, adjacent one of said plurality of rib members,
a second linking member fixedly coupled at a first end to said first of said plurality of rib members and fixedly coupled at a second end to said second, adjacent one of said plurality of rib members,
a portion of said first of said plurality of rib members, said portion extending between said first end of said first linking member and said first end of said second linking member, and
said cells thereby defining a zero-Poisson effect cellular structure adapted for expansion and contraction along an axis in a plane without dimensional change along an in-plane transverse axis and without dimensional change along an out-of-plane axis;
moving the cellular support structure, which is constructed and arranged to flex or deform, between a first position and a second position by structural flexing deformation of said first and second linking members to control the vehicle, such that a first in-plane dimension of the support structure changes during movement of the support structure between the first position and the second position, while a second transverse in-plane dimension of the support structure remains substantially constant during the movement of the support structure between the first position and the second position, and a third out-of-plane dimension of the support structure remains substantially constant during the movement of the support structure between the first position and the second position, wherein said resilient fluid contact surface is coupled as an external layer to said cellular support structure for deforming movement along with the flex or deformation of the support structure, wherein said deforming movement of the resilient skin occurs in a manner that exhibits substantially zero Poisson's ratio with respect to the plane of said support structure movement of the said first and second dimensions.

23. The method of claim 22, further comprising:

activating an actuating mechanism coupled to the support structure to flex or deform the support structure for the movement of the support structure between the first position and the second position.

24. The method of claim 23, further comprising:

permitting the support structure to anatomically return to the first position by the strain energy stored within said resilient fluid contact surface during resilient stretching to said second position.

25. An assembly for controlling a vehicle, comprising:

a resilient fluid contact surface constructed and arranged to act against a fluid passing over said contact surface; and a cellular support structure coupled to said fluid contact surface, said support structure having a length dimension in a first direction and a width dimension in a second direction transverse to said first dimension, said support structure comprising at least first and second substantially rigid rib support members extending in said second direction for the entirety of said width dimension and defining a row there between, and a plurality of substantially resilient linking members fixedly attached to said first and second rib support members to define a zero-Poisson effect cellular structure of enclosed cells adapted for expansion and contraction along an in-plane axis in said first direction without dimensional change along an in-plane transverse axis in said second direction and without dimensional change along an out-of-plane axis, each of said plurality of linking members comprising a first end and a second end, said first end connecting to said first rib support member and said second end connecting to said second rib support member, said support structure constructed and arranged such that the plurality of linking members flex or deform by structural deformation of said plurality of linking members between a first position and a second position, such that said length dimension of said support structure changes during movement of said support structure between said first position and said second position, while said width dimension of the support structure remains substantially constant during the movement of said support structure between said first position and said second position, and a third out-of-plane dimension of the support structure remains substantially constant during the movement of said support structure between said first position and said second position, wherein said fluid contact surface resiliently deforms along with said support structure, such that said deforming movement of the resilient fluid contact surface occurs in a manner that exhibits substantially zero Poisson's ratio with respect to the plane of said support structure movement of the said first and second dimensions.

26. An assembly according to claim 25, further comprising:

an actuating mechanism coupled to said support structure to flex or deform said support structure enabling the movement of said support structure between said first position and said second position.

27. An assembly according to claim 25, wherein said fluid contact surface is a resilient skin that stretches and contracts with movement of said support structure between the first position and the second position, wherein said movement of the resilient skin occurs in a manner that exhibits substantially zero Poisson's ratio with respect to the plane of said support structure movement of the said first and second dimensions.

28. An assembly according to claim 25, wherein said fluid contact surface forms part of a fluidfoil.

29. An assembly according to claim 28, wherein said support structure is positioned within said fluidfoil.

* * * * *